July 6, 1937.  E. F. McDONALD, JR  2,086,279
STARTING MEANS FOR WIND DRIVEN GENERATOR UNITS
Filed Oct. 17, 1935  2 Sheets-Sheet 2
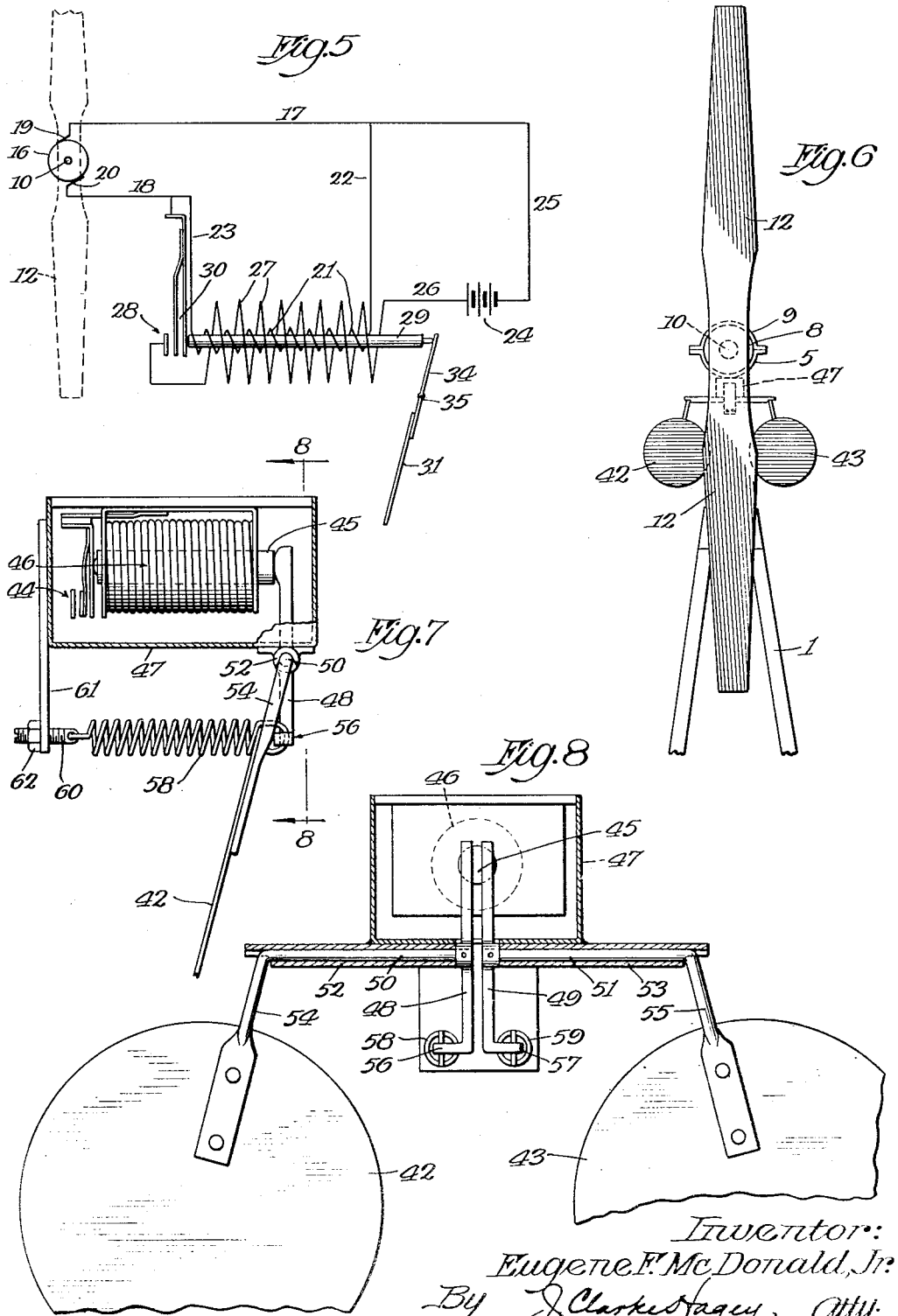
Inventor:
Eugene F. McDonald, Jr.
By J. Clarke Hagey, Atty.

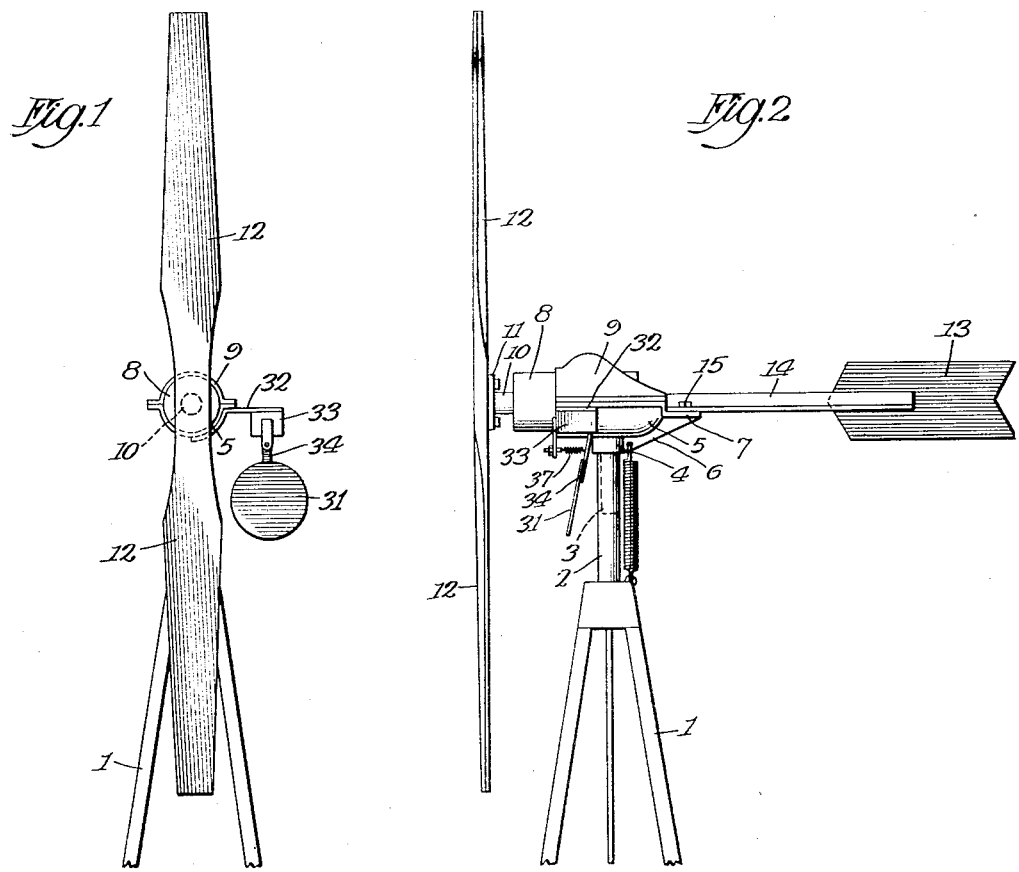
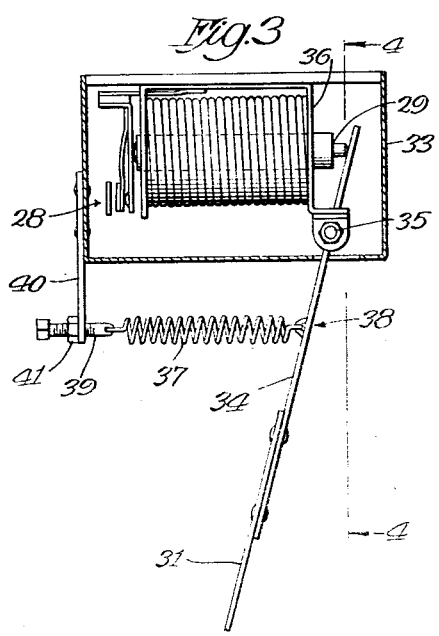
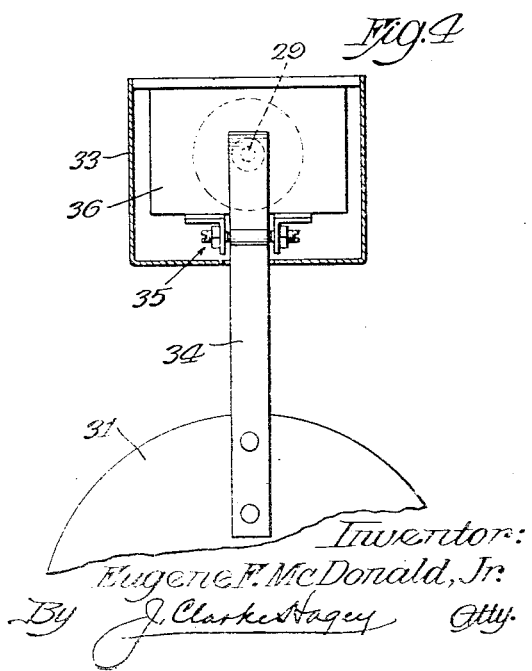

Patented July 6, 1937

2,086,279

UNITED STATES PATENT OFFICE 2,086,279

STARTING MEANS FOR WIND-DRIVEN GENERATOR UNITS

Eugene F. McDonald, Jr., Chicago, Ill., assignor to Wincharger Corporation, Sioux City, Iowa, a corporation of Minnesota Application October 17, 1935, Serial No. 45,449

7 Claims. (Cl. 290—44)

This invention relates to wind-driven generator-units, and more particularly concerns the provision of means controlled in operation by the wind for effecting the starting of such units when the force of the wind is not sufficient to do so, but is sufficient to continue the operation thereof when once started.

In devices of the class to which this invention pertains, a wind-driven impeller is employed for driving an electric generator, either directly or through step-up gearing or other mechanical connections, and the electric current thereby produced is used for charging storage batteries. While the arrangement herein shown and described comprises a two-bladed impeller mounted directly upon the rotor-shaft of an electric generator-motor which is supported upon the turn-table of the unit, it is to be understood that more impeller-blades may be used, intermediate mechanical connections may be employed, and the electric generator-motor may be differently placed and supported, without departing from the spirit and scope of this invention.

Compared with the usual many-bladed windmill wind-wheel, the type of impeller here employed is less powerful and rotates at much higher speed, and, because of the relatively small surface area offered thereby to the wind and the starting inertia of the mechanism to be driven, and to which the impeller is at all times connected, a greater force of wind is required to start the unit than is required to continue its effective operation.

Broadly stated, the principal object of this invention is to increase the efficiency of a wind-driven generator-unit by causing it to be started automatically whenever the force of the wind is sufficient to continue its operation. A more specific and equally important object is to provide a wind-operated device for controlling the action of the starting means, which device may be positioned and adjusted to meet different requirements and conditions, some of which will be mentioned later on in this description.

In the drawings—

Figure 1 is a front elevational view of a wind-driven generator-unit with one arrangement of my wind-operated controlling device;

Fig. 2 is a side elevational view of the generator-unit and controlling device of Fig. 1;

Fig. 3 is an enlarged side elevational view of the controlling device shown in Figs. 1 and 2, part of the casing thereof being cut away;

Fig. 4 is a vertical sectional view, taken upon the line 4—4 of Fig. 3, showing the controlling device in front elevation;

Fig. 5 is a diagram of the electric circuit arrangement and associated operating parts;

Fig. 6 is a front elevational view of a wind-driven generator-unit with another arrangement of my wind-operated controlling device;

Fig. 7 is an enlarged side elevational view of the controlling device shown in Fig. 6, part of the casing thereof being cut away; and Fig. 8 is a vertical sectional view, taken upon the line 8—8 of Fig. 7, showing the controlling device of Fig. 6 in enlarged front elevation.

Referring, first, to the generator-unit construction shown in Figs. 1, 2 and 6, 1 designates the upper part of a supporting tower, having an upwardly extending vertical shaft 2. The tower may be of any preferred construction and the shaft may be firmly secured thereto in any desired manner. The upper end-part of shaft 2 is hollow and receives the downwardly extending pivot-post 3 of a turn-table 4 which may, as in the present instance, be formed integrally with the lower semi-cylindrical part 5 of the generator-motor housing and with the rearwardly extending vertical fin 6 and horizontal table-flange 7, all arranged to turn horizontally upon the upper end of shaft 2. The generator-motor unit, the forwardly extending end-part of which is indicated at 8, may be of any preferred construction, is securely fastened within the lower part 5 of the housing, and is covered over by the upper part 9 of the housing. The rotor-shaft 10 of the generator-motor unit is provided with a head 11 to which the impeller 12 is bolted, and the usual rudder or tail-vane 13 is carried upon the outer end-part of a rearwardly extending arm 14, the forward end-part of which is secured in any desired manner upon the turn-table 4. I have shown arm 14 secured by a single screw-bolt 15 upon the table-flange 7, but, for the purpose of simplicity, I have not shown any means for swinging the arm thereupon to throw the unit out of the wind and out of operation, since the detailed construction of the parts thus far described does not form a part of this invention, and either of the two constructions of my wind-operated controlling device which I have shown and will describe may be used, regardless of the method employed for throwing the unit out of operation. That is to say, regardless of whether the impeller 12 be turned upwardly into horizontal position or swung to either side, the controlling device may be so mounted upon the unit as to be turned or swung out of the wind with the turning or swinging of the impeller.

Referring, now, to Figure 5, the impeller 12, rotor-shaft 10, and generator-motor 16 are diagrammatically illustrated, and the electric circuit leads 17 and 18 are shown connected with the brushes 19 and 20, respectively, of the generator-motor. A primary circuit solenoid-winding 21 is connected across leads 17 and 18 through respective branch leads 22 and 23, and storage battery 24 is connected with leads 17 and 18 through branch leads 25 and 26, battery circuit solenoid-winding 27, and the spring-contact battery circuit switch 28. Solenoid-windings 21 and 27 are shown as wound in the same direction and surround the switch-operating plunger-core 29, which acts upon the spring-contact 30 of switch 28. The arrangement thus far described acts as follows. When the impeller 12 and the generator-motor 16 are at rest, no electric current is being generated, and the battery circuit switch 28 is open, thus preventing the storage battery 24 from discharging back through the various leads and the generator-motor. When the generator-motor 16 is driven by impeller 12, an electric current is generated thereby in the primary circuit comprising lead 17, branch lead 22, solenoid-winding 21, branch lead 23, and lead 18, and plunger-core 29 is drawn forwardly by the electro-magnetic action of the solenoid-winding thereupon to compress the spring-contact 30, the resistance of which is sufficient, however, to prevent the plunger-core from closing the switch and the battery circuit until the voltage in the primary circuit reaches and exceeds that of the storage battery. When such primary circuit voltage is attained, the electro-magnetic power of solenoid-winding 21 upon plunger-core 29 becomes sufficient to overcome the resistance of spring-contact 30, resulting in the closing of switch 28 and the establishment of the battery charging circuit. With switch 28 closed, storage battery 24 will continue to be charged and the electro-magnetic action of solenoid-winding 27 upon plunger-core 29 will be added to that of solenoid-winding 21 in holding the switch closed as long as the voltage at the generator-motor 16 continues greater than that of the battery, but, whenever the voltage at the generator-motor falls below that of the battery, the direction of current in the battery circuit reverses, and the consequent reversed electro-magnetic action of solenoid-winding 27 opposes and overcomes that of solenoid-winding 21 upon plunger-core 29, resulting in the opening of switch 28 to break the battery circuit.

As herein embodied, my invention employs the apparatus just described to effect the starting of the impeller 12 and the generator-motor 16 when the force of the wind is insufficient to do so, but is sufficient to continue the operation thereof at the requisite speed to generate a battery-charging current voltage. As previously stated, when the impeller and the generator-motor are at rest, no electric current is being generated, and switch 28 is open. Under such conditions, if the battery circuit should be closed, as by the closing of switch 28 either manually or by the mechanism I shall next describe, the storage battery 24 will discharge back through the various leads and supply electric current to the generator-motor 16, causing it to operate, or start the operation of, the impeller 12. It is, of course, understood that the closing of the battery circuit to produce the above-described results may be accomplished by manual operation of switch 28, or of a separate switch connected around switch 28, but such manual operation requires the presence of an attendant and the exercise of judgment to estimate when the force of the wind would be sufficient to continue the operation of the unit with battery charging effect.

In Figures 1 to 4, inclusive, the controlling device is shown provided with a single wind-operated vane 31 and the device is mounted upon a bracket 32, secured to the lower semi-cylindrical part 5 of the generator-motor housing and extending out at one side thereof. As illustrated more particularly in Figs. 3 and 4, switch 28, plunger-core 29, and the plunger-operating solenoid are enclosed within a casing 33, the outer battery circuit solenoid-winding only being shown. A lever 34 is shown pivoted at 35 upon a bracket-extension of the solenoid supporting frame 36. The upper end-part of lever 34 impinges against the end of plunger-core 29, and the lower part of the lever extends downwardly through an opening in casing 33 and carries the vane 31. One end of a retractile spring 37 is attached at 38 to lever 34, and the other end of said spring is attached to an adjusting screw 39, which is screwed through a supporting plate 40 and provided with a jam-nut 41. By means of the screw 39, the tension of spring 37 is so adjusted that it will resist the operation of the vane 31 by the wind until the force thereof is sufficient to continue the operation of the unit as previously described. For illustration, if an eight-mile wind should be required to start the unit, and a six-mile wind would be sufficient to continue the battery-charging operation thereof when once started, the tension of the spring 37 should be adjusted to resist the operation of the vane 31 until the wind had reached a six-mile-per-hour velocity, thereby preventing the operation of lever 34, and the consequent thrust thereby upon the plunger-core 29, until the wind velocity should be sufficient to continue the battery-charging operation of the unit. In this manner, the controlling device acts automatically to prevent the closing of the battery circuit and the discharge of the storage battery therethrough until the wind has reached the velocity necessary to operate the unit at a speed which will effect the charging of the battery, and when this wind-velocity is reached, the spring 37 will be unable to resist the operation of vane 31 by the wind, and it will be blown backwardly, acting to swing lever 34 upon its pivot 35 and thrust plunger-core 29 forwardly to close switch 28, and effect the starting of the unit as previously described. The controlling device is shown mounted with the vane depending therebelow, in order to prevent it from introducing water, snow, or moisture within the casing 33, but it may be mounted otherwise than illustrated, and, for reasons to be presently described, more than one controlling device may be employed in the battery circuit and mounted as desired, either upon each side of the housing or upon other parts of the unit.

Referring, now, to the arrangement of my controlling device illustrated in Figures 6, 7, and 8, it may be explained that there are certain conditions in which it may be more convenient and desirable, and even necessary, to mount the controlling device nearer the plane of rotation of the impeller than I have shown. Where such an arrangement places the vane of the controlling device too near the impeller, there will be occasions when the impeller will come to rest in a position such that one of the blades thereof will blanket the vane to a greater or less extent and interfere with its satisfactory operation. Under such conditions, the use of a single controlling device with a pair of individually operable vanes, each resisted in operation by a separately adjustable spring and arranged as I have shown in Figure 6, is more economical and fully as efficient as the use and electrical connection of a pair of separate controlling devices. As shown in Figure 6, vanes 42 and 43 are so positioned with respect to the impeller that one or the other will be exposed to the wind stream regardless of the position of the impeller, and, as more clearly illustrated in Figures 7 and 8, the two vanes are carried upon separate lever-constructions which act individually upon a single plunger-core 45. The arrangement of the spring-contact battery circuit switch 44, plunger-core 45, and solenoid 46, within casing 47 is substantially the same as that of like parts already described in connection with Figures 3 and 4. A pair of rocker-levers, 48 and 49, are shown arranged side-by-side and fixed respectively upon the adjacent end-parts of axially aligned shafts 50 and 51, which shafts are rotatably supported within corresponding sleeve-bearings 52 and 53 secured to the bottom of casing 47. The shafts are bent downwardly at their outer ends to form lever-arms 54 and 55, lever-arm 54 carrying vane 42, and lever-arm 55 carrying vane 43. The upper end-parts of rocker-levers 48 and 49 impinge against the end of plunger-core 45, and the lower end-parts thereof are attached, as at 56 and 57, to respective retractile springs 58 and 59. These springs are alike, and a description of the one shown in Figure 7 will suffice for both. In this figure, spring 58 is shown attached at its forward end to an adjusting screw 60, which is screwed through a supporting plate 61 and provided with a jam-nut 62. It will be seen that each of the vanes 42 and 43, together with their respective rocker-levers 48 and 49 and springs 58 and 59, operate individually and in the same manner as the previously described vane 31, lever 34, and spring 37, and it is believed that further description thereof is unnecessary.

I claim:—

1. The combination, with a storage battery, a generator-motor, a wind-driven impeller operatively connected with said generator-motor, and electric circuit connections between said storage battery and said generator-motor, of a circuit-closing switch in said connections, and a wind-operated device acting upon operation to close said switch.

2. The combination, with a storage battery, a generator-motor, a wind-driven impeller operatively connected with said generator-motor, and electric circuit connections between said storage battery and said generator-motor, of a circuit-closing switch in said connections, a wind-operated device acting upon operation to close said switch, and adjustable means acting to resist the operation of said device.

3. The combination, with a storage battery, a generator-motor, a wind-driven impeller operatively connected with said generator-motor, and normally open electric circuit connections between said storage battery and said generator-motor, of electro-magnetically operated means acting upon operation to close said connections, closed electric circuit connections between said means and said generator-motor, and a wind-operated device acting upon operation to close said normally open electric circuit connections.

4. The combination, with a storage battery, a generator-motor, a wind-driven impeller operatively connected with said generator-motor, and normally open electric circuit connections between said storage battery and said generator-motor, of electro-magnetically operated means included in said circuit connections acting to open or to hold them closed in accordance with the direction of flow of electric current therein, closed electric circuit connections between said means and said generator-motor, and a wind-operated device acting upon operation to close said normally open circuit connections.

5. The combination, with a storage battery, a generator-motor, a wind-driven impeller operatively connected with said generator-motor, and battery circuit connections between said storage battery and said generator-motor, of a first coil-winding and a closed electric circuit connecting it with said generator-motor, a second coil-winding and a normally open spring-contact switch included in said battery circuit connections, a core-member surrounded by both of said coil-windings and acting when electro-magnetically influenced by the flow of electric current in either of said coil-windings to operate said switch, and a wind-operated device acting upon operation to close said switch regardless of the electro-magnetic influence of said coil-windings upon said core-member.

6. The combination, with a storage battery, a generator-motor, a wind-driven impeller operatively connected with said generator-motor, and battery circuit connections between said storage battery and said generator-motor, of a first solenoid winding and a closed electric circuit connecting it with said generator-motor, a second solenoid winding and a normally open spring-contact switch included in said battery circuit connections, a plunger-core surrounded by both of said solenoid windings and acting when electro-magnetically influenced by the flow of electric current in either of said solenoid windings to move axially thereof and control the operation of said switch, and a wind-operated device acting to effect the movement of said plunger-core and the operation of said switch.

7. The combination, with a storage battery, a generator-motor, a wind-driven impeller operatively connected with said generator-motor, and battery circuit connections between said storage battery and said generator-motor, of a first solenoid winding and a closed electric circuit connecting it with said generator-motor, a second solenoid winding and a normally open spring-contact switch included in said battery circuit connections, a plunger-core surrounded by both of said solenoid windings and acting when electro-magnetically influenced by the flow of electric current in either of said solenoid windings to move axially thereof and control the operation of said switch, and a wind-operated device comprising a lever pivotally supported with one end-part thereof contacting the end of said plunger-core, a wind-vane supported upon the other end-part of said lever, a spring acting upon said lever to resist the operation thereof, and means through which the effective action of said spring may be adjusted, the arrangement being such that, with the vane exposed to the wind stream, the lever will be swung to effect the endwise movement of said plunger-core and the closing of said switch when the force of the wind upon said vane is sufficient to overcome the resisting action of said spring.

EUGENE F. McDONALD, Jr.